(12) United States Patent
Snodgrass et al.

(10) Patent No.: US 7,430,192 B1
(45) Date of Patent: Sep. 30, 2008

(54) NET FORMATION-MERGING SYSTEM AND METHOD

(75) Inventors: Timothy E. Snodgrass, Palo, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 253 days.

(21) Appl. No.: 11/199,440

(22) Filed: Aug. 8, 2005

(51) Int. Cl.
*H04B 7/212* (2006.01)
(52) U.S. Cl. .................. 370/337; 370/347; 370/350
(58) Field of Classification Search .............. 370/337, 370/347, 350, 442, 458, 498, 445, 468, 310, 370/321, 437, 443
See application file for complete search history.

(56) References Cited

U.S. PATENT DOCUMENTS

| | | | | |
|---|---|---|---|---|
| 5,260,944 A * | 11/1993 | Tomabechi | .................. | 370/347 |
| 5,719,868 A | 2/1998 | Young | .................. | 370/436 |
| 6,108,338 A * | 8/2000 | Ramfelt et al. | .................. | 370/403 |
| 6,331,973 B1 | 12/2001 | Young et al. | .................. | 370/337 |
| 6,574,117 B1 | 6/2003 | Lebo | .................. | 361/801 |
| 6,577,641 B1 | 6/2003 | Izumi | .................. | 370/442 |
| 6,580,730 B1 | 6/2003 | Loukianov | .................. | 370/522 |
| 6,600,754 B1 | 7/2003 | Young et al. | .................. | 370/459 |
| 6,628,636 B1 * | 9/2003 | Young | .................. | 370/337 |
| 6,631,124 B1 | 10/2003 | Koorapaty et al. | .................. | 370/337 |
| 6,665,189 B1 | 12/2003 | Lebo | .................. | 361/730 |
| 6,741,466 B1 | 5/2004 | Lebo | .................. | 361/687 |
| 6,747,866 B1 | 6/2004 | Lebo et al. | .................. | 361/679 |
| 6,791,994 B1 | 9/2004 | Young et al. | .................. | 370/436 |
| 6,801,513 B1 | 10/2004 | Gibbons et al. | .................. | 370/337 |
| 6,810,022 B1 | 10/2004 | Young | .................. | 370/280 |
| 6,816,562 B2 | 11/2004 | Atkinson et al. | .................. | 376/39 |
| 2002/0067709 A1 | 6/2002 | Yamada et al. | .................. | 370/337 |
| 2003/0067906 A1 * | 4/2003 | Young | .................. | 370/347 |
| 2003/0115369 A1 | 6/2003 | Walter et al. | .................. | 709/253 |
| 2003/0165155 A1 | 9/2003 | Johnson et al. | .................. | 370/442 |
| 2004/0047332 A1 * | 3/2004 | Bensimon et al. | .................. | 370/347 |
| 2004/0057407 A1 | 3/2004 | Balachandran et al. | .................. | 370/336 |

(Continued)

OTHER PUBLICATIONS

Mathstar™, Silicon Objects Software Development Environment, Oct. 2003, 1-6.

(Continued)

*Primary Examiner*—Matthew D. Anderson
*Assistant Examiner*—Tan Trinh
(74) *Attorney, Agent, or Firm*—Nathan O. Jensen; Kyle Eppele

(57) ABSTRACT

A method of utilizing communication channel resources between nodes in a network of nodes is provided. Communication between a set of nodes in a communication network uses a time division multiple access protocol that includes a plurality of time slots. A set of time slots is allocated from the plurality of time slots to a first node of the set of nodes for transmission of a communication signal. At the first node, a time slot of the allocated set of time slots is identified that is no longer needed for transmission of the communication signal. Instead, the first node tunes to a network synchronization frequency during the identified time slot and receives a synchronization signal transmitted by a second node. The second node is not one of the set of nodes in the communication network. The first node synchronizes with the second node using the synchronization signal thereby allowing communication between the second node and the set of nodes.

20 Claims, 3 Drawing Sheets

U.S. PATENT DOCUMENTS

| | | | |
|---|---|---|---|
| 2004/0125784 A1 | 7/2004 | Lee et al. | 370/345 |
| 2004/0152478 A1 | 8/2004 | Ruohonen et al. | 455/502 |
| 2006/0056453 A1* | 3/2006 | Lindgren et al. | 370/468 |
| 2006/0104301 A1* | 5/2006 | Beyer et al. | 370/445 |
| 2007/0064721 A1* | 3/2007 | Garcia-Luna-Aceves | 370/445 |

OTHER PUBLICATIONS

Mathstar™, Field Programmable Object Arrays, Aug. 2004, 1-20.

"The Software Defined Radio (SDR) in Network Centric Operations (NCO)" by Alan Trimble, Ph.D. being presented at the IEEE, Oct. 2005.

U.S. Appl. No. 10/198,361 entitled "Ruggedized Electronics Sub-System Module" and having inventor Steve I. Lebo; filed Jul. 18, 2002.

U.S. Appl. No. 10/197,737 entitled "Ruggedized Electronics Module Cooling System" and having inventors Steve I. Lebo and Scott J. Sellner; filed Jul. 18, 2002.

U.S. Appl. No. 10/229,941 entitled "Modular Coommunication Platform" and having inventor Richard D. Spring, Timothy E. Snodgrass, Robert R. Jakoubek and Steve I. Lebo; filed Aug. 28, 2002; Pub. On; Mar. 18, 2004.

* cited by examiner

NET FORMATION-MERGING SYSTEM AND METHOD

FIELD OF THE INVENTION

The subject of the disclosure relates generally to communication signal processing. More specifically, the disclosure relates to a method for improved net formation-merging using otherwise wasted time slots in a time division multiple access system.

BACKGROUND

The radio spectrum is a finite resource expected to accommodate ever increasing numbers of communication nodes whether in a commercial environment or in a military environment. Tactical military and commercial applications require self-organizing, wireless networks that can operate in dynamic environments and provide peer-to-peer communications. For multiplexed communication systems, the communication system typically consists of many communication nodes that require active service over a single communication channel. As a result, a variety of multiple access schemes have been devised that allow multiple users to share the same communication channel. For example, communication systems have been developed to provide communication between many communication nodes for brief intervals of time using the same communication channel. Such a multiple access scheme is known as Time Division Multiple Access (TDMA). A communication system that employs TDMA is referred to herein as a TDMA system or a TDMA network.

A TDMA communication system can be used in conjunction with other types of multiple access systems including frequency division multiple access and code division multiple access systems. For example, frequency hopping using a frequency synthesizer to "hop" the signal from one frequency to the next can be used in a TDMA communication system to improve performance characteristics including providing a low probability of intercept. The communication nodes are synchronized to follow a frequency hopping code thereby ensuring that the communication nodes are on the same frequency at the same time. The hopping pattern may be assigned to each node in its identification code. As a result, it is difficult for a communication node that does not know the frequency hopping code to synchronize with the other communication nodes.

An advantageous characteristic of a TDMA system is the ability of neighboring nodes to transmit without interference. In a TDMA system, each carrier frequency is divided into repeating frames. The frames are subdivided into a plurality of time slots. A communication node within the TDMA system is assigned one or more time slots for transmitting and/or for receiving a communication signal. Each communication node is assigned particular time slots in a continuum of recurrent frames for transmission of its bursts and for reception of its own bursts and the bursts of other nodes. The time slots are designed to be non-overlapping when the various nodes' signals arrive at the receiver. A base radio may manage all of its assigned communication nodes by keeping all of them synchronized and allowing each node to communicate at a known, or deterministic, time. Alternatively, the communication nodes may use a self-organizing system to allocate time slots and to maintain synchronization with each other. For example, the Unifying Slot Assignment Protocol (USAP), which is disclosed in U.S. Pat. No. 5,719,868, provides a protocol for maintaining such a self-organizing communication system.

With the growth in the number of communication nodes, the need to quickly form and merge networks as nodes move into a neighborhood has increased. Mobile, multi-hop, broadcast packet radio networks provide rapid and convenient deployment, self organization, mobility, and survivability. In this type of network, a transmission from one node is broadcast to all nodes in its "neighborhood". Ultra-high frequency (UHF) systems generally have a neighborhood defined by nodes within line of sight of the transmitting node. For illustration, FIG. 1 depicts an overlapping neighborhood system 10 that includes a first neighborhood 18, a second neighborhood 20, and a third neighborhood 22. The first neighborhood 21 includes nodes 1-5 and f that are within line of sight of node 3. The second neighborhood 22 includes nodes 2, 3, 5, a, c, d, and f that are within line of sight of node f. The third neighborhood 23 includes nodes a, b, c, d, e, f, and g that are within line of sight of node c. All of the nodes in a neighborhood, however, may not be in communication with the other nodes in the neighborhood. For example, two networks encompass the communication nodes of system 10. A first network 12 includes nodes 1-5 that are in communication with each other, and a second network 14 includes nodes a, b, c, d, e, f, and g that are in communication with each other. Multiple hops may be required, for example, to provide communication between node f and node e. The second neighborhood 20, however, includes nodes 2, 3, and 5 that are not currently in communication with node f as indicated by the broken lines. The ability to merge network 12 with network 14 in a time and a power efficient manner is a key capability of a TDMA system.

To avoid interference between communication nodes, a TDMA system requires good clock synchronization between the communication nodes. Timing acquisition is a process for synchronizing the receiver's clock with the transmitter's clock so that the receiver can determine the boundary between two transmitted symbols. In general, timing acquisition is performed by sending a preamble before information bits in a TDMA frame. Additionally, each communication signal transmitted in a time slot includes a predefined synchronization word. The synchronization word must be matched in order to validate the communication that follows. If no match is achieved, the information can not be processed from the communication signal. By identifying the location of the synchronization word in a received signal, a node maintains synchronization with the other nodes in the network. This scheme requires a reasonably accurate clock timing recovery before frame synchronization (or any form of communication) can take place. Any false or missed detection of the synchronization pattern results in a loss of the information in the data frame. This poses a particular problem in a TDMA system operating in a dynamic environment in which nodes move in and out of neighborhoods. The new node must synchronize with the TDMA system before communication between the new node and the TDMA system can be accomplished.

For example, to establish synchronization with a new node to a neighborhood such as the node f, a frame synchronization pattern is periodically inserted into the data stream by a transmitter within the first network 12. In an example protocol, once every few seconds a network synchronization time slot is allocated to transmit the frame synchronization pattern. A communication node within the first network 12 may pseudo randomly transmit the network synchronization information. The remaining communication nodes in the first network 12 listen. The node f may similarly transmit synchronization information for the second network 14. Based on statistical theory, the first network 12 and the second network 14 can be merged within an expected time delay assuming that both the first network 12 and the second network 14 are using the same TDMA protocol, for example, based on one of the nodes a, c, d, or f receiving the network synchronization information from a node (for example, nodes 2, 3, or 5) included in the first network 12 or a node included in the first network 12 receives the synchronization information from one of the nodes a, c, d, or f.

A common and accurate representation of time is also assumed in determining the likelihood of successful synchronization and the time delay associated with merging the first network 12 with the second network 14. If, however, the clock of the second network 14 is not synchronized with sufficient accuracy to the clock of the first network 12, significant time delays (possibly on the order of hours or days) can result before synchronization between the first network 12 and the second network 14 is completed. Significant delays may result due to clock inaccuracies of only 100 µs. What is needed, therefore, is a system and a method that improves the merging of networks within a multi-hop neighborhood into a single network. What is further needed is a system and a method that reduce the waste of communication resources.

SUMMARY

A particular example of the invention provides a method for improving the process of merging communication nodes within two or more networks into a single network. To improve the ability of a communication node to merge with an existing TDMA network, otherwise wasted time slots within the TDMA network are used to listen for network synchronization information from nodes not currently synchronized with the existing TDMA network. As a result, the time delay associated with synchronizing with the communication node is reduced in a statistical sense. Additionally, because otherwise wasted time slots are utilized, the synchronization performance improvement is achieved in a power efficient manner.

An exemplary embodiment of the invention relates to a method of utilizing communication channel resources between nodes in a network of nodes. Communication between a set of nodes in a communication network uses a time division multiple access protocol that includes a plurality of time slots. A set of time slots is allocated from the plurality of time slots to a first node of the set of nodes for transmission of a communication signal. At the first node, a time slot of the allocated set of time slots is identified that is no longer needed for transmission of the communication signal. Instead, the first node tunes to a network synchronization frequency during the identified time slot and receives a synchronization signal transmitted by a second node. The second node is not one of the set of nodes in the communication network. The first node synchronizes with the second node using the synchronization signal thereby allowing communication between the second node and the set of nodes.

Other exemplary embodiments of the invention include a communication network and a communication node that utilize the method.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION

Figure 1:
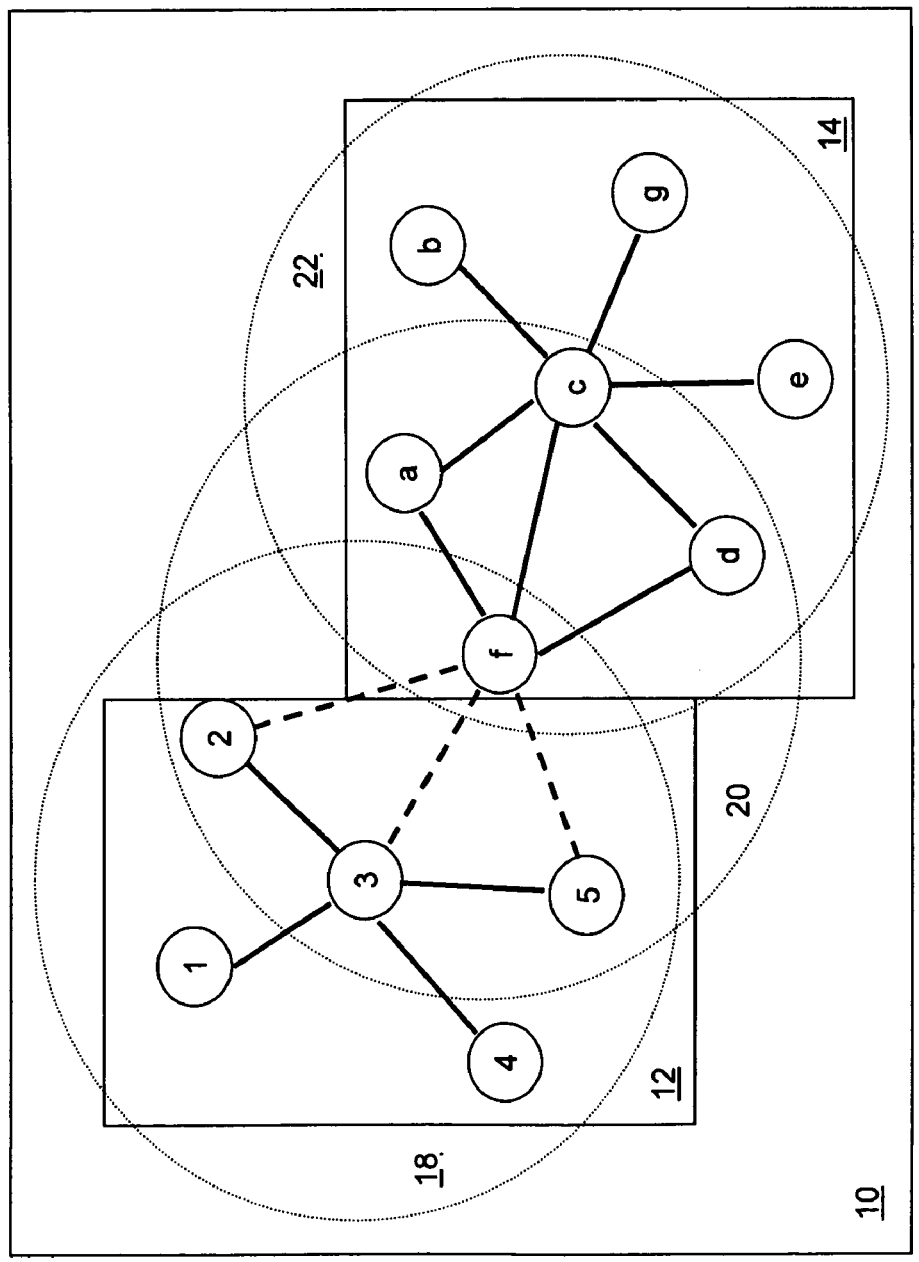
FIG. 1 is a block diagram of nodes within multiple networks that are capable of merging into a single network.
Figure 2:
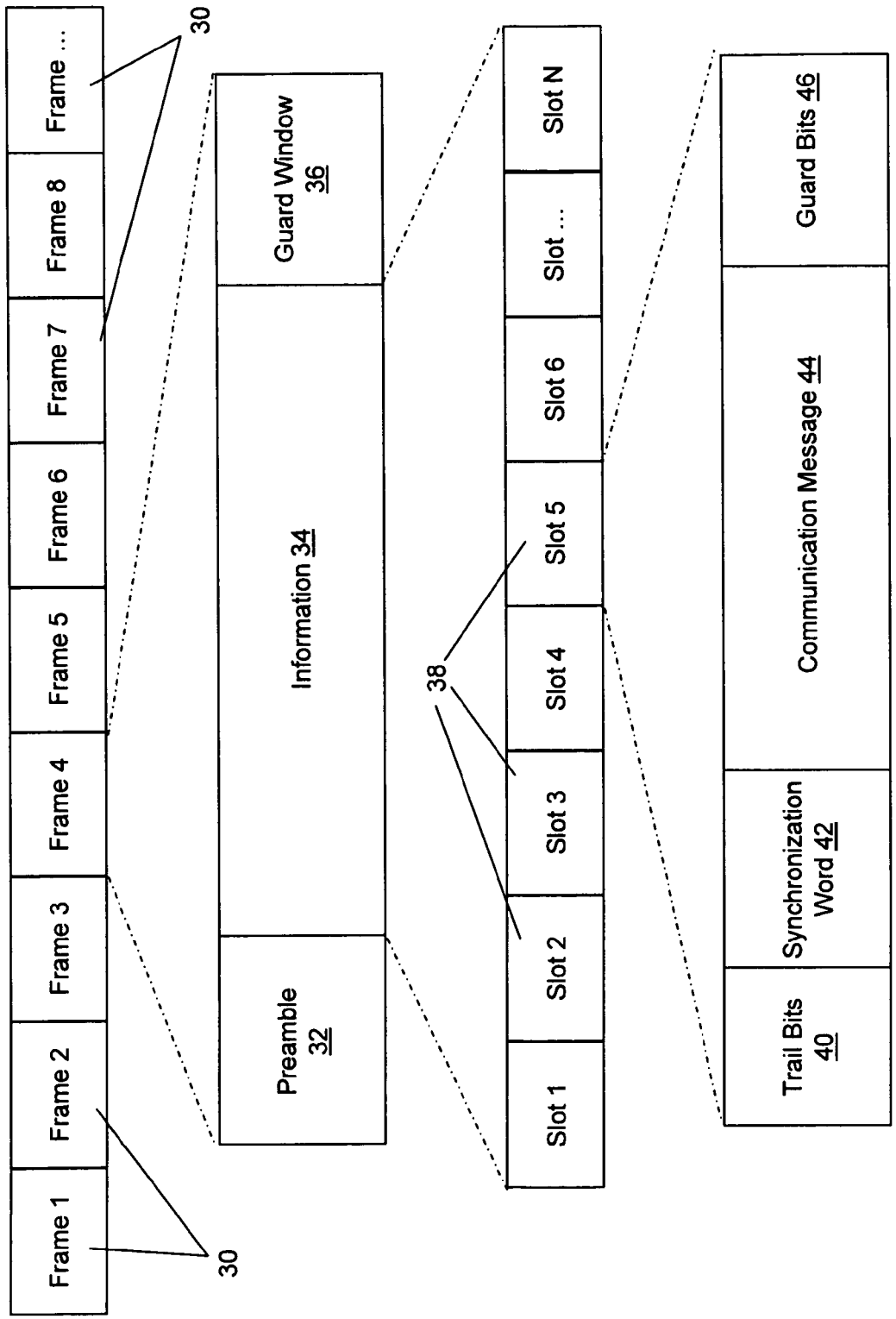
FIG. 2 is a general block diagram of an exemplary TDMA protocol structure.

As shown with reference to FIG. 2, using an exemplary TDMA protocol, each carrier frequency is divided into a plurality of frames 30 of a specific time duration. Each TDMA frame 30, for example, includes a preamble 32, information 34, and a guard window 36. Further, each frame 30 may include a plurality of frequencies. The information 34 is subdivided into a plurality of time slots 38. Each time slot 38, for example, includes trail bits 40, a synchronization word 42, a communication message 44, and guard bits 46. For example, with reference to FIG. 1, the communication nodes 1-5 within the first network 12 are assigned one or more time slots 38 for transmitting the communication message 44. Each communication node is assigned particular time slots 38 in a continuum of recurrent frames 30 for transmission of its bursts and for reception of its own bursts and the bursts of other nodes. Assignment of the time slots 38 may be accomplished using a variety of protocols as known to those skilled in the art. The TDMA protocol can be subdivided into multiple cycles. For example, a bootstrap cycle and a broadcast cycle each of one second duration can be included as part of the TDMA protocol. Each cycle may have the same or different duration and support different communication functions. For example, the bootstrap cycle includes information transmitted to each communication node that allocates the time slots among the nodes. The broadcast cycle includes the allocated time slots for broadcast transmission between the communication nodes. The number of cycles, the length of the cycle, the length of each frame, the number of time slots, the subdivisions of the time slots, etc. is a matter of design choice, and should not be viewed as limiting; other numbers of cycles, frame lengths, time slot subdivisions, etc. may be used without departing from the scope of the present invention.

Figure 3:
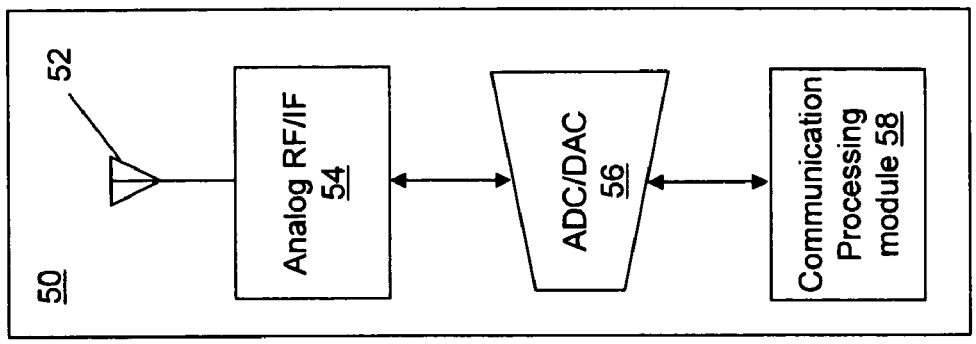
FIG. 3 is a block diagram of a communication node in accordance with an exemplary embodiment.

With reference to FIG. 3, a communication node 50 in accordance with an exemplary embodiment is shown. Communication node 50 includes, but is not limited to, a transceiver antenna 52, an analog RF/IF filter 54, an analog-to-digital converter/digital-to-analog converter (ADC/DAC) 56, and a communication processing module 58. Communication node 50 may provide communication capabilities across the entire communication spectrum or across only a portion of the spectrum. In operation, a communication signal is received by transceiver antenna 52, filtered from a transmission radio frequency (RF) to an intermediate frequency (IF) by the analog RF/IF filter 54, converted from an analog signal to a digital signal by ADC/DAC 56, and demodulated and otherwise processed by the communication processing module 58 to extract information. Similarly, in a reverse procedure, digital data formed and modulated by the communication processing module 58 is sent to the ADC/DAC 56, converted from a digital signal to an analog signal by the ADC/DAC 56, filtered from IF to RF by the analog RF/IF filter 54, and transmitted by the transceiver antenna 52. In an alternative embodiment, the signal transmitted/received is digital and no ADC/DAC 56 is included. In another alternative embodiment, the communication node 50 may include separate transmit and receive antennas. Additional components may be utilized by the communication node 50. For example, the communication node 50 includes one or more power source that may be a battery.

As discussed previously with reference to FIG. 2, each communication node 50 is assigned selected time slots for transmission based on the node's needs. Each communication node 50 is able to receive in time slots that it has not been assigned to transmit. A communication node 50 may have more than one time slot either consecutive or spaced within one or more frame 30. One communication node 50 may be designated to serve as a time reference, synchronizing the time base of the other communication nodes operating within the first network 12 to the same time. Any communication node 50 can serve as the time reference. Alternatively, the first network 12 may be self organizing.

Figure 4:
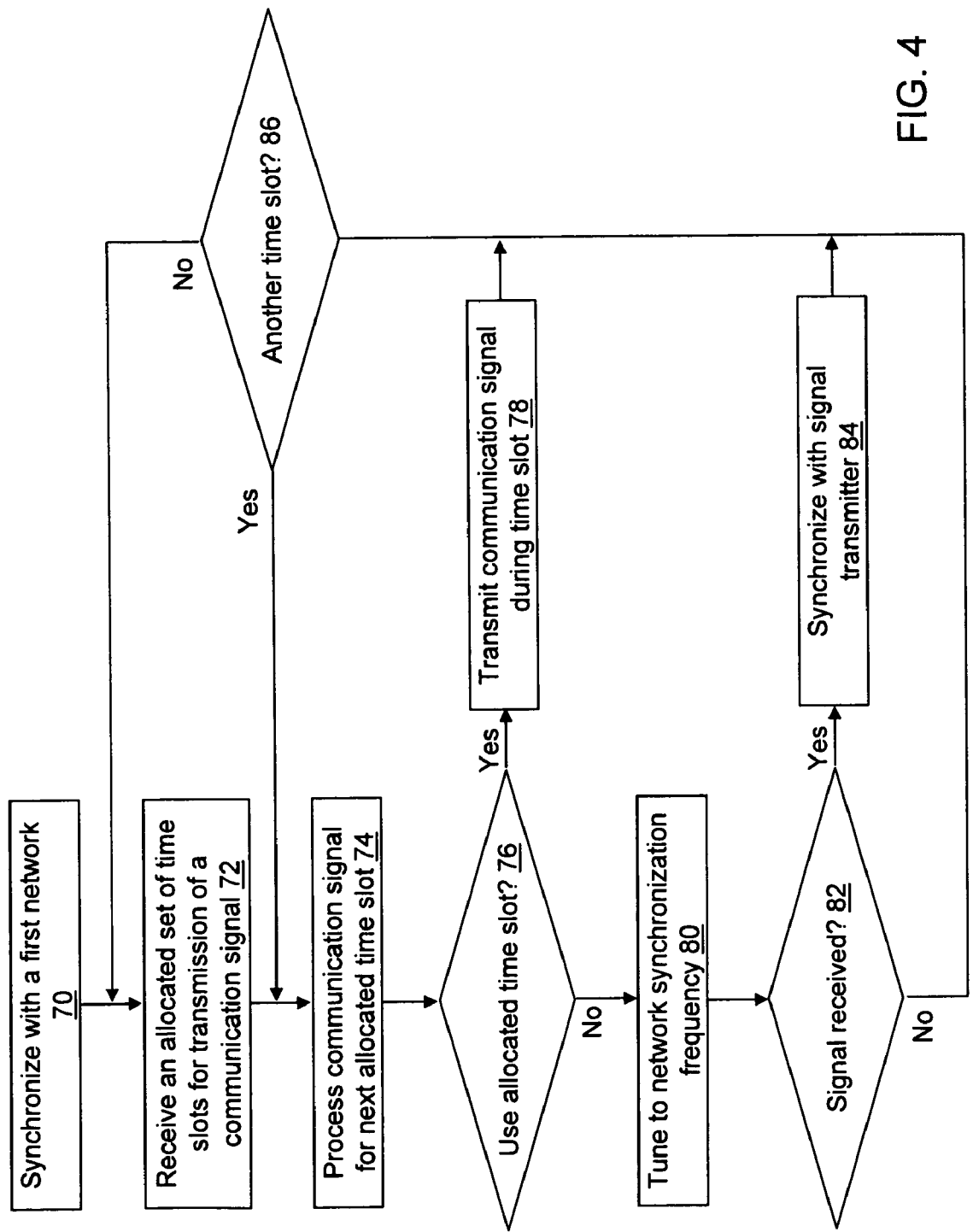
FIG. 4 is a flow diagram illustrating exemplary operations at a communication node of a TDMA network in accordance with an exemplary embodiment.

With reference to FIG. 4, exemplary operations of any communication node 50 within the first network 12 are described. The exemplary operations apply also to any communication node 50 within the second network 14. In an operation 70, the communication node 50, for example node 3 in FIG. 1, synchronizes, as known to those skilled in the art, with the first network 12 that includes nodes 1, 2, 4, and 5. In an operation 72, the node 3 receives an allocated set of time slots for transmission of one or more communication signal. In general, each node 1-5 of the first network 12 is assigned at least one time slot within each frame 30. The allocated set of time slots may be a single time slot.

In an operation 74, the node 3 processes the communication signal in the communication processing module 58 for the next allocated time slot. In an operation 76, the communication processing module 58 determines if it is still necessary to transmit the communication signal in the next allocated time slot. For example, the information to be transmitted in the communication signal may have timed out or otherwise no longer needs to be transmitted. If it is still necessary to transmit the communication signal in the next allocated time slot, in an operation 78, the communication signal is transmitted during the time slot. If it is not necessary to transmit the communication signal in the next allocated time slot, in an operation 80, node 3 tunes to a network synchronization frequency as known to those skilled in the art. The network synchronization frequency may be randomly selected from a set of network synchronization frequencies. Alternatively, the network synchronization frequency may be selected from a set of network synchronization frequencies based on a maximum time difference between the first network 12 and the second network 14 or other known or yet to be known techniques.

Node 3 listens for a communication signal from another network during the next allocated time slot. Because the first network 12 allocated the time slot for transmission by node 3, the other nodes 1, 2, 4, and 5 of the first network 12 are not transmitting. In an operation 82, a determination is made as to whether or not a signal is received. If a signal is not received during the time slot, processing continues at an operation 86. If a signal is received, in an operation 84, node 3 synchronizes with the transmitter of the signal as known to those skilled in the art. For example, node 3 may receive a network synchronization signal from node f of the second network 14. As a result, the first network 12 merges with a network of the signal transmitter by synchronizing the network clocks and allocating time slots among the nodes in communication with both networks. In an operation 86, the existence of another time slot allocated to node 3 is determined. If another time slot is allocated, processing continues at operation 74. If another time slot is not allocated, processing continues at operation 72.

Any number of networks can be merged using this methodology through any communication node of the network. Because using current TDMA protocols, the allocated time slot is wasted, no additional communication resources are used in synchronizing with the second network 14. The use of the wasted time slot to listen for network synchronization signals improves the statistical probability and time delay associated with merging the first network 12 with the second network 14. Preferably, each node of both the first network 12 and the second network 14 utilize otherwise wasted time slots in the manner described above.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A communication network, the network comprising:
a plurality of communication nodes configured to use a time division multiple access protocol to allow communication between the plurality of communication nodes, the time division multiple access protocol configured to allocate a plurality of time slots to the plurality of communication nodes; and
a first node of the plurality of communication nodes, wherein the first node is allocated a set of time slots from the plurality of time slots to transmit a communication signal, the first node
identifying a time slot of the allocated set of time slots that is no longer needed to transmit the communication signal;
tuning to a network synchronization frequency during the identified time slot;
receiving a synchronization signal transmitted by a second node, wherein the second node is not one of the plurality of transceiver nodes; and
synchronizing with the second node using the synchronization signal thereby allowing communication between the second node and the plurality of communication nodes.

2. The network of claim 1, wherein the time division multiple access protocol includes a second multiple access protocol.

3. The network of claim 1, wherein the time division multiple access protocol includes a frequency hopping protocol.

4. The network of claim 1, wherein the first node randomly selects the network synchronization frequency from a set of network synchronization frequencies.

5. The network of claim 1, wherein the first node selects the network synchronization frequency from a set of network synchronization frequencies based on a maximum time difference between the first node and the second node.

6. The network of claim 1, wherein tuning to a network synchronization frequency during the identified time slot comprises tuning to a plurality of network synchronization frequencies during the identified time slot.

7. The network of claim 1, wherein tuning to a network synchronization frequency during the identified time slot comprises tuning to a single network synchronization frequency during the identified time slot.

8. A communication node, the node comprising:
- a transmitter, the transmitter transmitting a communication signal during a set of time slots, the set of time slots allocated to the communication node from a plurality of time slots using a time division multiple access protocol, the time division multiple access protocol supporting communication between a plurality of communication nodes;
- a communication processing module, the communication processing module
- identifying a time slot of the allocated set of time slots that is no longer needed to transmit the communication signal; and
- synchronizing with a second node wherein the second node is not one of the plurality of communication nodes; and
- a receiver, the receiver
- tuning to a network synchronization frequency during the time slot; and
- receiving a synchronization signal transmitted by the second node, the synchronization signal used to synchronize the second node and the plurality of communication nodes.

9. The node of claim 8, wherein the time division multiple access protocol includes a second multiple access protocol.

10. The node of claim 8, wherein the time division multiple access protocol includes a frequency hopping protocol.

11. The node of claim 8, wherein the communication processing module randomly selects the network synchronization frequency from a set of network synchronization frequencies.

12. The node of claim 8, wherein the communication processing module selects the network synchronization frequency from a set of network synchronization frequencies based on a maximum time difference between the first node and the second node.

13. The node of claim 8, wherein the transmitter and the receiver are implemented as a transceiver.

14. The node of claim 8, wherein tuning to a network synchronization frequency during the identified time slot comprises tuning to a plurality of network synchronization frequencies during the identified time slot.

15. The node of claim 8, wherein tuning to a network synchronization frequency during the identified time slot comprises tuning to a single network synchronization frequency during the identified time slot.

16. A method of utilizing communication channel resources between nodes in a network of nodes to allow synchronization with a new node, the method comprising:
- communicating between a set of nodes in a communication network using a time division multiple access protocol, the time division multiple access protocol including a plurality of time slots, wherein a set of time slots is allocated from the plurality of time slots to a first node of the set of nodes for transmission of a communication signal; and
- at the first node, identifying a time slot of the allocated set of time slots that is no longer needed for transmission of the communication signal; and
- at the first node, tuning to a network synchronization frequency during the identified time slot;
- receiving, at the first node during the identified time slot, a synchronization signal transmitted by a second node, wherein the second node is not one of the set of nodes in the communication network; and
- at the first node, synchronizing with the second node using the synchronization signal thereby allowing communication between the second node and the set of nodes.

17. The method of claim 16, wherein the time division multiple access protocol includes a second multiple access protocol.

18. The method of claim 16, wherein the time division multiple access protocol includes a frequency hopping protocol.

19. The method of claim 16, further comprising randomly selecting the network synchronization frequency from a set of network synchronization frequencies.

20. The method of claim 16, further comprising selecting the network synchronization frequency from a set of network synchronization frequencies based on a maximum time difference between the first node and the second node.

* * * * *